Feb. 20, 1934.  C. S. BRAGG ET AL  1,947,895
BRAKE MECHANISM FOR AUTOMOTIVE VEHICLES
Original Filed July 29, 1926   3 Sheets-Sheet 1
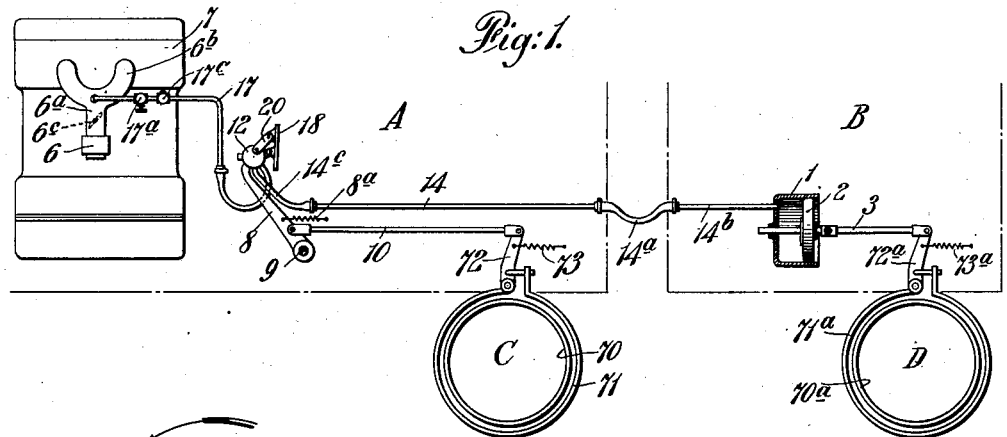
Fig. 1.
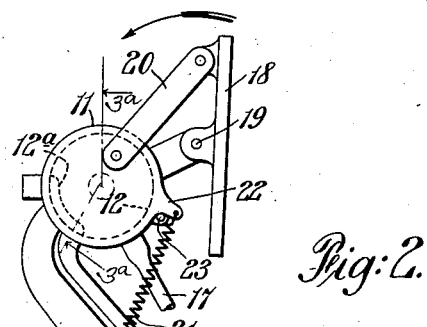
Fig. 2.
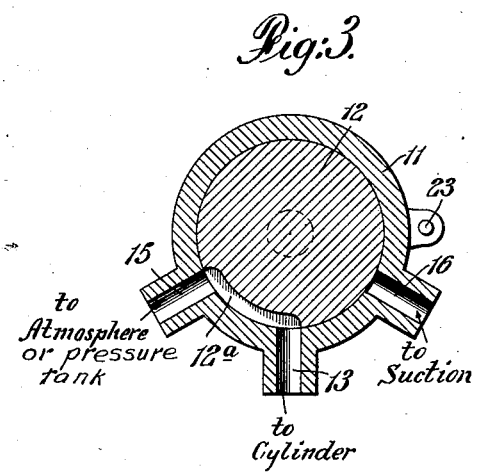
Fig. 3.
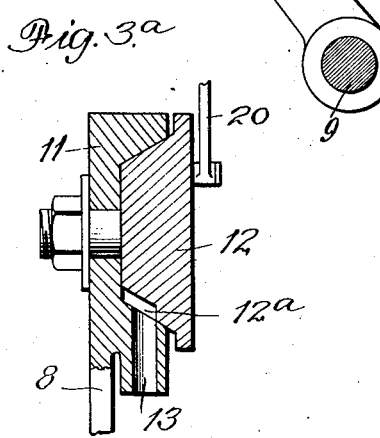
Fig. 3.a
INVENTORS
BY
ATTORNEY

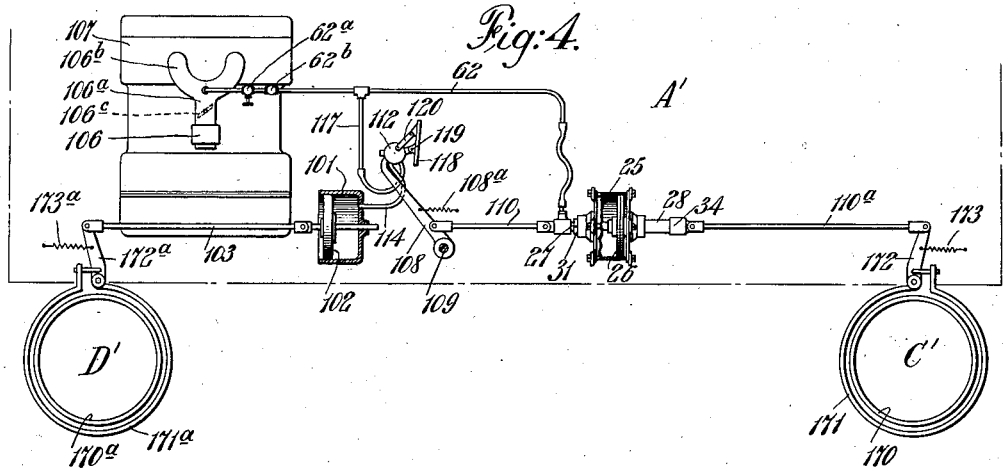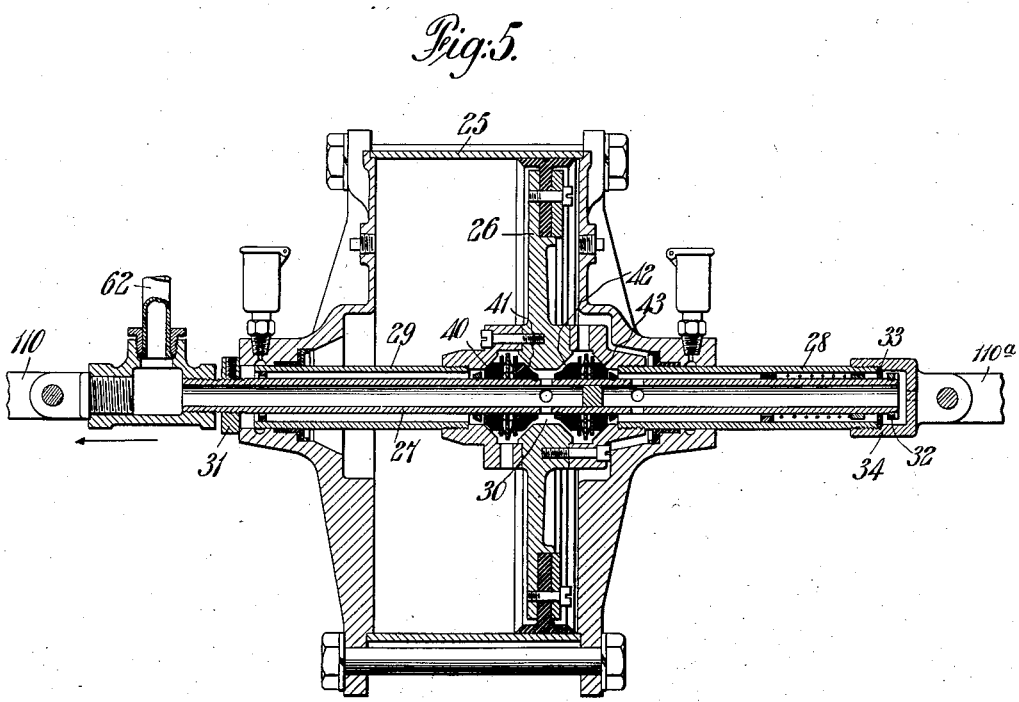

Feb. 20, 1934.   C. S. BRAGG ET AL   1,947,895
BRAKE MECHANISM FOR AUTOMOTIVE VEHICLES
Original Filed July 29, 1926   3 Sheets-Sheet 3
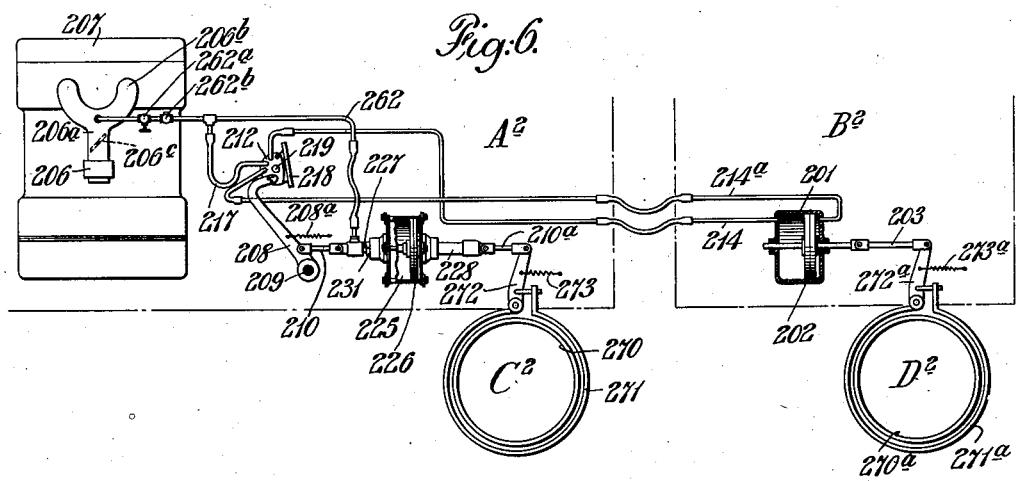
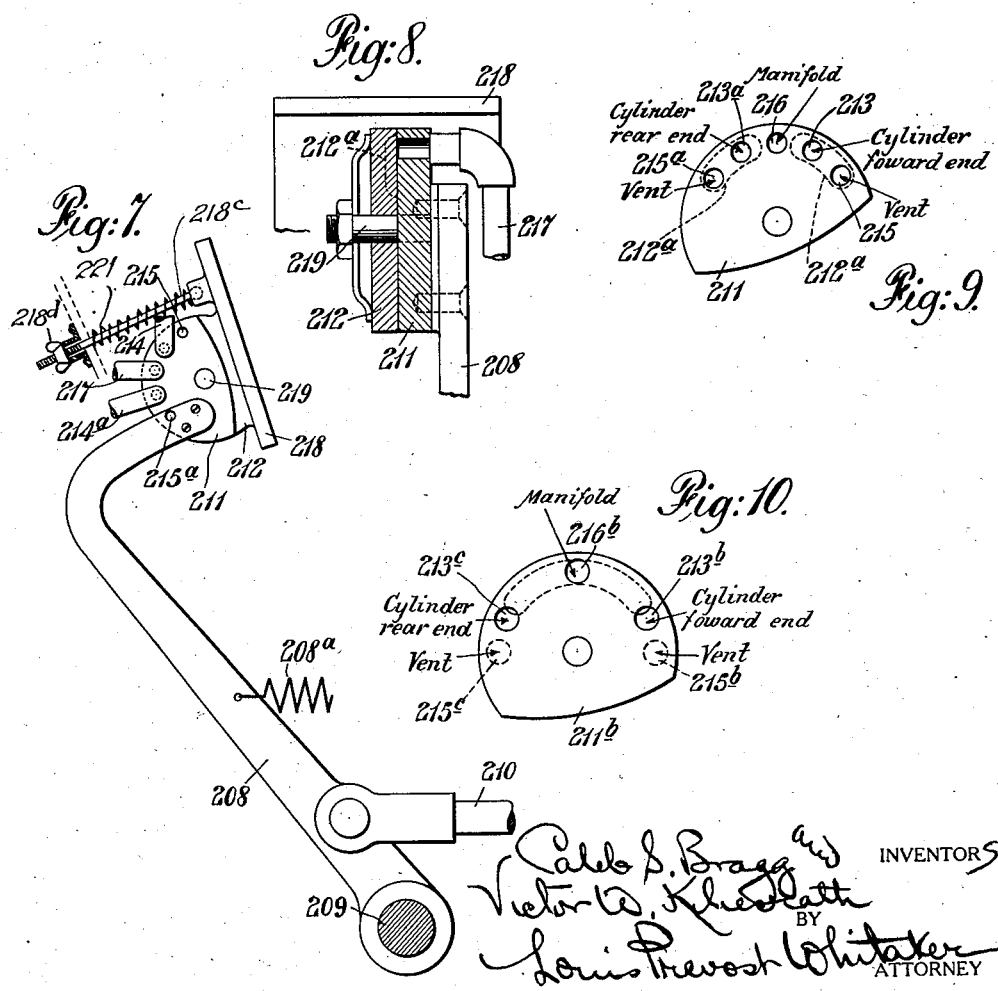

Patented Feb. 20, 1934

1,947,895

UNITED STATES PATENT OFFICE 1,947,895

BRAKE MECHANISM FOR AUTOMOTIVE VEHICLES

Caleb S. Bragg, Palm Beach, Fla., and Victor W. Kliesrath, Port Washington, N. Y., assignors to Bragg-Kliesrath Corporation, Long Island City, N. Y., a corporation of New York Application July 29, 1926, Serial No. 125,615
Renewed March 27, 1929

38 Claims. (Cl. 188—152)

Our invention consists in the novel features hereinafter described, reference being had to the accompanying drawings, which illustrate several embodiments of the same selected by us for purposes of illustration, and the said invention is fully disclosed in the following description and claims.

Our invention relates to brake mechanism for automotive vehicles, and comprises a pedal lever operatively connected with certain brake mechanism of the vehicle for operating the same either directly or through the intervention of a power actuator, brought into operation by the movement of said pedal lever, the said pedal lever being provided wth a pedal movable with respect thereto, and operatively combined with valve mechanism for controlling the separate power actuator operatively connected with other brake mechanisms of the same vehicle, or with brake mechanisms carried by a trailer propelled by the main vehicle, whereby the operator may, by placing his foot in engagement with said pedal, operate the pedal lever alone to effect the operation of the brake mechanisms connected therewith, or may operate the pedal alone and the brake mechanisms connected therewith, or may operate both sets of brake mechanisms, as may be desired. It is to be understood that the power actuators employed may be of any preferred type, but we prefer to employ power actuators comprising each a cylinder and piston, the latter being operated by differential pressures on opposite sides thereof, and preferably such actuators operated by suction obtained from the suction passage of the internal combustion engine employed for propelling the vehicle, or vehicles, and preferably by a connection with the intake manifold between the throttle valve of the engine, and the engine cylnders, the higher pressure fluid relied upon being usually air at atmospheric pressure, and the said actuators, whether controlled by the pedal levers or by the pedal, may be either sing'e or double acting, as preferred. It is also to be understood that the pedal lever may be directly connected with the brake mechanism which it controls, without the intervention of a power actuator, if desired. The operator is therefore provided with two control mechanisms which may be operated by his foot, either independently or jointly, to control different brake mechanisms of the same vehicle, as the front and rear wheel brakes of a four wheel brake mechanism, or any desired number of brake mechanisms on a trailing vehicle, according to the installation in which the invention is embodied.

Our invention also comprises the novel features of construction and combination of parts hereinafter described and particularly pointed out in the claims. The particular details of the movably mounted pedal and the valve mechanism connected therewith, are not claimed herein, as they form the subject matter of our former application for Letters Patent of the United States filed April 3, 1925, and given Serial No. 20,333.

In the drawings, which illustrate several embodiments of our present invention,

Fig. 1 is a diagrammatic view illustrating an installation embodying our invention in connection with brake mechanism of an automotive vehicle, and the trailer propelled thereby.

Fig. 2 is an enlarged detail view of one form of pedal lever, pedal, and pedal operated valve mechanism which may be employed in carrying our invention into effect.

Fig. 3 is a detail sectional view of the pedal operated valve mechanism shown in Fig. 2, and further enlarged.

Fig. 3ª is a vertical sectional view on the line 3ª—3ª of Fig. 2.

Fig. 4 represents a diagrammatic view of a modified installation in which the separate brake mechanisms are on the same vehicle, and are each independently applied by means of a power actuator.

Fig. 5 represents an enlarged sectional view of the power actuator illustrated in Fig. 4, in connection with the main vehicle therein shown.

Fig. 6 is a view similar to Figs. 1 and 4, in which the pedal lever is connected with the valve mechanism of a single acting actuator, and the movable pedal is connected with valve mechanism for controlling a double acting actuator.

Fig. 7 is an enlarged detail view of the movable pedal and valve mechanism illustrated in Fig. 6, in side elevation.

Fig. 8 is a rear view of the same partly in section.

Fig. 9 is a diagrammatic view illustrating the registering ports of the valve mechanism shown in Figs. 6, 7 and 8.

Fig. 10 is a view similar to Fig. 9 showing a slight modification.

Referring to the form of our invention shown in Figs. 1, 2, and 3, in which we have shown, diagrammatically, our invention embodied in brake mechanism for a main vehicle, indicated in dotted lines at A, and a trailer, B, also indicated in dotted lines, 7 represents an internal combustion engine provided with the usual carburetor, 6, suction passage, 6ª, intake manifold, 6ᵇ, and throttle valve, 6ᶜ. The brake mechanism of the main vehicle, is indicated diagrammatically at C, as comprising a friction drum, 70, friction band, 71, brake applying lever, 72, and retracting spring, 73. It is to be understood that the brake mechanism may be of any preferred type, and may be applied through suitable connections with as many wheels of the vehicle as desired in any well known or usual manner. In this instance we have shown the main vehicle provided with a brake pedal lever, 8, connected pivotally at 9, to the chassis and connected by a link, 10, with the brake mechanism of the main vehicle, in this instance being shown as connected to the lever, 72.

The trailing vehicle, B, is diagrammatically represented in Fig. 1, as provided with brake mechanism, indicated at D, and comprising brake drum, 70ᵃ, brake band, 71ᵃ, brake lever, 72ᵃ, and its retracting spring, 73ᵃ, it being also understood that any form of brake mechanism may be employed, and that the brake mechanism indicated at D, may be the brake mechanism for as many wheels of the trailer, as desired. 1, represents the cylinder of a power actuator, mounted on the trailer and provided with a piston, 2, in this instance a single acting piston, which is connected by a link, 3, with brake mechanism for one or more wheels of the trailer, as may be desired, the actuator being operated by differential pressures, and controlled by means of a pedal, 18, carried by the main pedal lever, 8, and movably supported thereon and connected with controlling valve mechanism for operating the power actuator. In this instance we have shown the actuator adapted to be operated by suction from a suction passage of the engine. As indicated in Figs. 1, 2 and 3, the controlling valve mechanism comprises a housing, 11, rigidly secured to the pedal lever adjacent to its upper end, and provided with a rotary valve, indicated at 12, mounted in the housing and provided with a recess, 12ᵃ. The housing is provided with a port, indicated at 13, connected by a pipe, 14, with the cylinder of the power actuator. Where the valve is intended to control brake mechanism on another vehicle the pipe, 14, is provided with a flexible connecting portion, 14ᵃ, extending between the vehicles, and the trailer is provided with a continuation, 14ᵇ, leading from said flexible connection to the cylinder, 1, of the actuator. The portion, 14ᶜ, of the pipe, 14, adjacent to the pedal, is also made flexible to permit of the movement of the pedal lever. The valve casing or housing, 11, is also provided with a port, 16, which is connected by a pipe, indicated at 17, a portion of which is flexible and connected with the intake manifold, 6ᵇ, of the internal combustion engine between the throttle valve, 6ᶜ, and the engine cylinder, and the housing, 11, is also provided with a port, 15, communicating with the atmosphere, or other source of higher pressure. The pedal, 18, is pivotally connected at 19, with the pedal lever, 8, provided with the usual retracting spring, 8ᵃ, connected with the chassis, and operatively connected with the valve, 12, in this instance, by a link, 20. The valve and pedal are also provided preferably, with yielding means for holding them in the off position, and in this instance we have shown a spring, 21, connected with an arm, 22, secured to the valve, adapted to engage a stop, 23, secured to the housing for holding the valve in normal or off position, at which time the recess, 12ᵃ, of the valve places the cylinder port, 13, in communication with the higher pressure port, or atmospheric port, 15, permitting the brake mechanism to return with the piston to normal position.

The pedal lever and pedal therefor, present in the construction above described, a means whereby the operator can, by placing his foot on the pedal, operate either of the separate brake mechanisms, in this instance the separate brake mechanisms of separate vehicles. The parts of the valve being in their normal position as shown in Fig. 3 if the operator pushes forward on the pedal without disrupting this relation of the parts or without connecting the passage 12ᵃ with the port 16, he may operate the brake mechanism C without operating the brake mechanism D. On the other hand, if the operator, without pressing forward sufficiently to move the pedal lever, rocks his foot so as to move the pedal with respect to the lever, the valve, 12, may be operated so as to bring the recess, 12ᵃ, into position to connect the cylinder port, 13, with the suction port, 16, when the air in the actuator cylinder, forward of the piston, will be exhausted, and the actuator piston will move forward and apply the brake mechanism, or mechanisms, D, of the trailer. If the operator performs both of these actions, that is to say, not only rocks the pedal, 18, but simultaneously depresses the lever, 8, both sets of independent brake mechanisms will be simultaneously actuated to the desired extent, which the operator can determine for himself by the degree of pressure exerted against the lever, 8, and the degree to which the pedal is rocked forward by his foot. On releasing the brake pedal, both sets of brake mechanisms will be instantly relieved, and will be returned to normal position. While we have shown, in Fig. 1, the pedal and brake lever, independently controlling independent brake mechanisms on different vehicles, it will be readily understood that our invention is equally applicable to the operation of independent brake mechanisms on the same vehicle, that is to say, for example, pedal lever may be operatively connected with the brake mechanism for the rear wheels of the main vehicle, and the pedal lever may control through the connected power actuator, the brake mechanisms of any pair of wheels of the same vehicle, as the front wheels of a four wheel vehicle, or the intermediate wheels of a six-wheel vehicle.

It is to be understood that the pedal is so connected with the pedal lever that in any position in which it may be rocked with respect to the lever, the operator can nevertheless exert his physical force also to depress the lever with respect to its pivotal connection, and we prefer to so construct the pedal and its connection with the valve mechanism which it controls, that the placing of the operator's foot on the pedal in the normal position of his foot, will tilt the pedal forward, in the direction of the arrow in Fig. 2, and effect the shifting of the valve mechanism in a direction to operate the power actuator connected therewith, and the pedal lever is so pivoted that its operative movement is forward and downward, so that if the operator does not change the position of his foot from the natural position thereof, the depression of the pedal will effect the rocking of the pedal rearwardly in a direction to disconnect the suction port, 16, from the cylinder port. It follows from this construction, which is best illustrated in Fig. 2, that in order to operate the lever, 8, and the brake mechanism connected therewith, independently of the brake mechanism controlled by the pedal, the operator must consciously rock the toe of his foot a little back of the normal position, when he applies it to the pedal, and also that if he desires to continuously operate the brake mechanism controlled by the actuator to the pedal, he must continue to depress his toe beyond the natural position, if the lever is also depressed. This arrangement permits him to have a complete and independent control of both the lever and pedal, and the separate brake mechanisms operated thereby at all times, and further, it provides that if the operator thoughtlessly applies his foot with unnecessary force to the pedal and lever, the pedal will be gradually reversed during the descent of the pedal lever, the brake mechanism will offer an increasing resistance to the movement of the lever, so that the accidental jamming of the brakes and locking the wheels is rendered unlikely.

In Fig. 4 we have illustrated, diagrammatically, a slightly different installation, in which either of the brakes controlled by the pedal lever, are normally operated also by a power actuator, in this instance a double acting power actuator, illustrated in Fig. 5 in detail, the pedal itself merely operating the valve mechanism of the actuator under normal conditions, it being preferably so connected with the actuator piston, that the physical force of the operator may be applied in addition to the power of the actuator or the brake mechanism controlled thereby may be directly applied by the pedal lever in case of failure of power. In this figure the actuator controlled by the pedal is shown as operating other brake mechanism of the main vehicle instead of the brake mechanism of the trailer, as in Fig. 1. In this figure, in which similar parts are indicated by the same reference numbers with 100 added to avoid repetition, C', represents certain brake mechanism of the main vehicle, as the brake mechanisms for the rear wheels thereof, and D', represents certain other independently operable brake mechanism for other wheels, as for example, the front wheel brake mechanism, or brake mechanisms for an intermediate pair of wheels, as in a six wheel vehicle. In this instance we have shown a power actuator interposed between the pedal lever, 108, and the brake mechanism, C', controlled thereby, the link rod, 110, being operably connected with the valve mechanism of the actuator, which is preferably of the kind illustrated in our former application for Letters Patent of the United States filed October 2, 1926, and given Serial No. 60,018, although the particular form of actuator is not material to our present invention and will not be particularly described. Briefly stated, the actuator comprises a cylinder, 25, provided in this instance with a double acting piston, 26, the hub of which contains the reversing valve mechanism, the valves of which are indicated at 40, 41, 42 and 43, and are operatively controlled by a longitudinally movable valve actuating sleeve, 27, extending through the hub of the piston, and through the oppositely disposed piston rods, 28 and 29, through which atmospheric air is admitted to the cylinder under the control of the valve mechanism, the valve mechanism being connected with the intake manifold, 106ᵇ, of the internal combustion engine, 107, by a pipe, 62, having a flexible portion connected with the valve actuating sleeve, and communicating with a suction chamber, 30, in the interior of the piston hub. The suction vavles, 41 and 42, are normally held in open position when the piston is retracted, as shown in Fig. 5, by means of an adjustable collar, 31, on the valve sleeve, 27, which engages the adjacent end of the cylinder so that the piston is maintained submerged in vacuum when the engine is running, but the particular construction of the actuator and its valve mechanism form no part of our present invention. The connecting rod, 110, from the lever, 108, is connected to the valve actuating sleeve, 27, and the piston rod, 28, is in this instance connected by a link rod, 110ᵃ, with the brake operating lever, 172, of the brake mechanism, C'. In this instance the valve sleeve, 27, is connected with the piston of the actuator, 25, by means permitting lost motion, sufficient to insure the operation of the valve mechanism, and in Fig. 5, for example, we have shown the valve actuating sleeve provided with a collar, 32, adapted to engage a collar, 33, on the piston rod and the inner end of a cap, 34, secured thereto to provide the limited lost motion necessary, and at the same time to permit the valve actuating sleeve to directly operate the piston and the brake mechanism connected therewith in either direction in case of failure of power.

The brake lever, 108, is provided with the pedal, 118, pivoted thereto at 119, and operatively connected by link, 120, with the valve, 112, in the same manner as that indicated in Figs. 2 and 3. 101 represents the actuator for the brake mechanism, D', which, for convenience, we term the auxiliary actuator provided with the piston, 102, connected by link, 103, with the lever, 172ᵃ, of the brake mechanism, D', which may be considered to represent the front wheel brake mechanism of the same vehicle (or which may be the brake mechanism of a trailer, as indicated in Fig. 1, if preferred). The cylinder of the auxiliary actuator is connected with the valve mechanism, by a pipe, 114, and the suction port of the valve mechanism is connected by a suction pipe, 117, with the manifold of the internal combustion engine, in this instance being connected with the main suction pipe, 62, and having a flexible portion to permit the operation of the pedal and lever.

By means of this construction, if the operator places his foot on the pedal 118, and depresses the pedal lever, 108, without rocking the pedal, the valve sleeve, 27, will be moved in the direction of the arrow in Fig. 5, so as to shift the reversing valve mechanism and admit atmospheric air in rear of the piston, 26, while maintaining the forward end of the cylinder in communication with the suction pipe, 62, thereby applying the brake mechanism, C' without admitting any appreciable quantity of air to the suction passage of the engine from the actuator cylinder, as the cylinder forward of the piston was previously exhausted. If the operator, on the contrary, merely rocks the pedal, 118, in a forward direction (to the left in Fig. 4) the auxiliary actuator, 101, will be operated by exhausting the air forward of the piston to apply the brake mechanism, represented at D', as the front wheel brakes of the vehicle, for example, or by both rocking the pedal, 118, and depressing the pedal lever, 108, both sets of brakes may be simultaneously applied to the degree desired by and under the perfect and independent control by the foot of the operator. In other words, the operation of the two sets of brake mechanisms will be the same as that with reference to Fig. 1, except that in this case the main brake mechanism, C', can also be applied by power. Whereas in Fig. 4 one of the independently operable valve mechanisms controls an actuator in which the piston is submerged in vacuum as indicated at 25, 26, and the other valve mechanism controls an actuator as 101, 102, in which the piston is normally submerged in atmosphere, it follows that even when both actuators are simultaneously operated, by the simultaneous actuation of both valve mechanisms, air can only be withdrawn from one of them at a time and delivered to the intake manifold. Thus in the construction shown in Fig. 4, the operation of both valve mechanisms by rocking the pedal, 118, and simultaneously depressing the lever, 108, air will be withdrawn from cylinder, 101, but no air will be withdrawn from cylinder, 25, for the reason previously stated. If both actuators are now simultaneously released, the piston, 102, will be returned to normal position by admitting air to the cylinder, 101, but the piston, 26, will be returned to its normal position by equalizing pressures on opposite sides of the piston, 26, as the valve mechanism returns to the normal position shown in Fig. 5, and subsequently withdrawing the air previously admitted to produce a stroke of piston, 26, into the suction manifold. The advantage of this arrangement is that as air is never withdrawn at the same time from both actuators into the suction passage, the liability of stalling the engine by the connection to the suction passage of two actuators is greatly reduced, if not entirely eliminated, without interfering with the rapidity of operation of the actuator. If, for example, two actuators having their pistons submerged in atmosphere were employed, the air would have to be exhausted from both actuator cylinders simultaneously during the power stroke to apply the brakes, at which time the throttle valve, 106$^c$, would ordinarily be in a closed or partly closed position, and the quantity of explosive mixture passing through the suction passage would be substantially at minimum. Under such conditions the discharge of so large a quantity of air into the suction passage would probably stall the engine, and if the regulating valve, 62$^a$, were closed sufficiently to prevent this, the operation of applying the brakes would be materially slowed down and retarded. On the other hand, if two cylinders in which the pistons are submerged in vacuum were employed, while there would not be a simultaneous withdrawal of air from both cylinders during the power stroke of the piston, there would be such a simultaneous withdrawal of air from both cylinders when the brakes were released, and this might easily take place before the throttle valve could be opened to accelerate the engine, thus stalling the engine. The construction illustrated in Fig. 4 obviates this difficulty entirely and permits the use of actuators of adequate size in vehicles having a comparatively small engine. In this construction it will also be understood that when the brake mechanism, C', has been fully applied by the actuator the operator, by further depressing the pedal, 108, and taking up the lost motion between the valve actuating sleeve and piston, 26, of the main actuator, may add his force to that of the actuator, and it will also be understood that in case of failure of power, the operator may, by depressing the pedal lever, 108, take up this lost motion and positively move the piston, 226, of the main actuator and operate the brake mechanism, C', thereof, by his physical force alone when necessary or desired. The subject matter disclosed in
Fig. 4 above described has been specifically cov-
ered in a divisional application filed August 3, 1929 and given Serial No. 383,220.

In Fig. 6 we have shown, diagrammatically, an installation including a main vehicle and trailer, in which separate brake mechanisms, in this instance brake mechanisms of the main vehicle and trailer, are independently or simultaneously controlled by the pedal lever, and the pedal movable with respect thereto, through separate power actuators, and in this instance we have shown the actuator controlled by the pedal as being double acting instead of single acting. In this figure, A$^2$, represents the main vehicle, indicated diagrammatically by dotted lines, and B$^2$, in a similar manner indicates the trailing vehicle. The main vehicle is shown provided with an internal combustion engine, 207, having a carburetor, 206, connected by suction passage, 206$^a$, with the intake manifold, 206$^b$, the suction passage being provided with a throttle valve, 206$^c$. The brake mechanism of the main vehicle is indicated at C$^2$, and may be of any desired type, and may affect as many wheels of the vehicle as preferred. As represented diagrammatically, it includes the brake drum, 270, the brake band, 271, brake lever, 272, and retracting spring, 273, the brake lever being connected by link rod, 210$^a$, with the piston rod, 228, of a power actuator, the cylinder of which is indicated at 225, and which may be of the kind illustrated in Fig. 5 having its piston normally submerged in vacuum, for example, and previously described, or it may be of other desired type. As shown, the valve actuating sleeve, 227, is connected by suction pipe, 262, with the intake manifold of the engine, a portion of the pipe being flexible. The valve actuating sleeve, 227, is connected by link, 210, with the brake pedal lever, 208, pivoted at 209, so that the forward movement of the lever effects the operation of the valve mechanism of the actuator and applies the brake mechanism, C$^2$, of the main vehicle, in the manner described with reference to Fig. 4, and is also capable of applying the physical force of the operator directly to the brake mechanism, as previously described, when necessary or desirable.

The brake mechanism for the trailer, B$^2$, indicated diagrammatically at D$^2$, and shown diagrammatically as the brake drum, 270$^a$, brake band, 271$^a$, brake lever, 272$^a$, and retracting spring, 273$^a$, is operated in this instance by a double acting actuator, the cylinder of which is indicated at 201, under the control of valve mechanism carried by the pedal lever and operated by the movable pedal, 218. In this instance the actuator, 201, is provided with a double acting piston, 202, the piston rod of which is connected by link, 203, with the brake lever, 272$^a$, of the trailer brake mechanism. The pedal lever, 218, is pivoted at 219, to the upper end of the brake lever, 208, and operatively connected with the controlling valve mechanism for the actuator, 201, which we term for convenience of reference, the auxiliary actuator. Any desired form of valve mechanism may be employed, but we have shown in this instance a valve mechanism carried by the pedal lever and comprising a plate, 211, rigidly connected to the lever, 208, and provided with a port, 213, connected by pipe, 214, with the cylinder, 201, forward of the piston, a port, 213$^a$, connected by pipe, 214$^a$, with the cylinder in rear of the piston, said plate being provided with vent apertures, 215 and 215$^a$, communicating with the atmosphere and with a port, 216, connected with the manifold by a flexible pipe, 217, in this instance connected with the main suction pipe, 262. 212 represents a valve member pivotally connected to the plate, 211, and provided with recesses, 212a, indicated in dotted lines in Fig. 9, so located as to connect each of the ports, 213 and 213a, with the vent apertures, 215 or 215a, when the valve is in neutral position, in which it is held by a spring, 221 thus maintaining the piston 202, submerged in atmosphere. By rocking the pedal in the forward direction against this spring, the suction port, 216, will be placed in connection with the port, 213, leading to the front end of the cylinder of the actuator. The vent aperture, 215, for this portion of the cylinder will be closed and the port 213a, communicating with the rear portion of the cylinder will remain in communication with the vent aperture, 215a. The air forward of the piston, 202, will therefore be withdrawn through the suction passage, while atmospheric air will be admitted in rear of the piston through the vent aperture, 215, so that the piston will move forward in a direction to apply the brakes and can be arrested at any moment by rocking the pedal back to normal position. By rocking the pedal backward of its normal position, the suction port, 216, can be placed in communication with the port, 213a, leading to the cylinder in rear of the piston to withdraw the air previously admitted, while the vent, 215, will be in communication with the port, 213 and will admit air to the cylinder, 201, forward of the piston, thus positively moving the piston rearwardly to release the brake mechanism and restore it and the piston, 202, to normal position. When the foot is removed from the pedal, the spring, 221, will restore it to normal or off position.

In the arrangement illustrated in Fig. 6, therefore, it will be seen that if both valve mechanisms are simultaneously actuated to effect a power stroke of each, air will be withdrawn only from the cylinder, 201, forward of the piston thereof, as in the construction shown in Fig. 4, the air having been previously exhausted from cylinder, 225, forward of its piston when both valve mechanisms are simultaneously released. However, air will be withdrawn from both actuator cylinders in rear of the pistons therein to permit the release of the brake mechanisms, C², and effect the release of the brake mechanisms, D². As this increased amount of air, however, is withdrawn during the release and return of the brakes, stalling of the engine can be prevented by properly adjusting the restricting valve, 262a, as it is not so important that the brakes should be swiftly returned to released position as it is that they should be quickly applied, especially in view of the fact that a very slight relaxation of pressure is sufficient to relieve the braking action.

In some instances it is desirable to maintain a state of rarification in the cylinder on both sides of the piston when the apparatus is in normal or off position. In Fig. 10 we have shown, diagrammatically, a modified form of valve mechanism operable by the pedal to secure this result. In this figure, 211b, represents the stationary valve plate secured to the pedal lever, as in Figs. 7 and 8, and provided with a suction port, 216b, connected with the suction pipe leading to the intake manifold, and with ports, 213b and 213c, leading respectively to the forward and rear chambers of the cylinder. The movable valve plate connected with the pedal lever is provided with a recess, indicated in dotted lines in Fig. 10 and 212b, which, in the normal or off, and in the neutral positions of the apparatus, extends over the suction port, 216, and on both sides thereof, sufficiently far to include a portion of each of the ports, 213b and 213c, as clearly shown in Fig. 10, thus connecting the suction port with the cylinder on both sides of the piston, and normally maintaining a rarification in both ends of the cylinder. The pedal, 218, is conveniently provided with means, as a stop rod, 218c, having an adjusting nut, 218d, as shown in Fig. 7, to hold the pedal valve in neutral position when the piston and brake lever are in the off or at rest position. It will be understood that after the application of the brakes, by rocking the pedal, 218, forward, if the pedal is returned to its neutral position, the portions of the cylinder on each side of the piston will be connected with each other, causing an instantaneous equalization of pressures and permitting the brakes to release themselves under the action of their brake and other retracting springs, and will also be connected with the suction port, so that air will be gradually withdrawn from both ends of the cylinder of the auxiliary actuator. To effect a return stroke of the piston of the auxiliary actuator by power, the pedal must be rocked backward of its neutral position, which can be readily done after the pedal lever is depressed, thus admitting atmospheric air to the cylinder of the auxiliary actuator forward of the piston. The movable valve plate in this instance will be provided as shown in Fig. 10, with two vent ports, 215b and 215c, indicated in dotted lines in Fig. 10, one of which is adjacent to, but out of registration with each of the corresponding cylinder ports, so that when the movable plate is shifted in either direction, the recess, 212b, will be moved into full registration with one of the cylinder ports while the vent port for the other cylinder port will be brought into registration therewith, confining the suction to one end of the cylinder and admitting air to the other.

It will be seen that with the valve mechanism indicated in Fig. 10, applied to the pedal lever illustrated in Fig. 6, the operation would be the same as previously described except that as the piston of the auxiliary actuator would also be submerged in vacuum the power stroke of both the main and auxiliary pistons would be effected without admitting any material quantity of air to the intake manifold, the only air withdrawn from the actuator cylinder being withdrawn during or after the return strokes of said pistons.

Out of abundant caution, and in order to insure that the air withdrawn from the actuators shall not at any time be admitted so rapidly as to be likely to stall the internal combustion engine, we prefer to locate in the suction pipe, 262, for example, an adjustable restricting valve, indicated at 262a, and we also prefer to employ between the restricting valve and the actuators, a check valve, 262b, as indicated in Fig. 6, for example, to insure the greatest degree of rarification in the actuators, and the suction pipes leading thereto, which is obtained in the suction passage of the engine between the operations of the actuators. Similar restricting valves are also indicated in Fig. 1 at 17a, and in Fig. 4 at 62a, and similar check valves are indicated, in Fig. 1 at 17b, and in Fig. 4 at 62b.

What we claim and desire to secure by Letters Patent is:—

1. In brake mechanisms for automotive vehicles having independently operable sets of brake mechanisms, the combination with a pivoted pedal lever, and a rocking pedal pivotally connected therewith for operating said lever, connections between said lever and one set of brake mechanisms for operating the same, operative connections between said pedal and another set of brake mechanisms for effecting the operation thereof by the movement of said pedal with respect to said lever, independently of the movement of the lever, whereby the operator, by placing his foot on said pedal may independently or simultaneously control the operation of said independently operable brake mechanisms.

2. In brake mechanisms for automotive vehicles, provided with independently operable sets of brake mechanisms, the combination of a pivoted pedal lever, operative connections between said pivoted pedal lever and one set of brake mechanisms, a power actuator comprising a cylinder and a piston operatively connected with another set of brake mechanisms, means for establishing differential pressures on opposite faces of said piston including controlling valve mechanism, of a rocking pedal pivotally connected with said pedal lever and operatively connected with said valve mechanism by means permitting the operation of said valve mechanism by the movement of said pedal with respect to said lever, whereby the operator, by placing his foot in engagement with said pedal may independently or simultaneously control the application of said independently operable brake mechanisms.

3. In brake mechanisms for automotive vehicles, provided with independently operable sets of brake mechanisms, the combination of a pivoted pedal lever, operative connections between said pivoted pedal lever and one set of brake mechanisms, a power actuator comprising a cylinder and a piston operatively connected with another set of brake mechanisms, means for establishing differential pressure on opposite faces of said piston, including controlling valve mechanism, of a rocking pedal pivotally connected with said pedal lever, operative connections between said pedal and said valve mechanism for operating the valve mechanism by the relative movement between the pedal and lever independent of the movement of the lever, yielding means for holding said pedal lever in off position, and yielding means for holding said pedal in off position with respect to the pedal lever, whereby the operator, by placing his foot on said pedal, may control said independently operable brake mechanisms independently or simultaneously.

4. In brake mechanisms for automotive vehicles, provided with an internal combustion engine for propelling the same, having a suction passage for explosive mixture between the throttle valve and the engine cylinder, and independently operable brake mechanisms, the combination of a pivoted pedal lever, operative connections between said pedal lever and one set of brake mechanisms, a rocking pedal pivotally connected with said pedal lever, a power actuator comprising a cylinder and piston, operative connections between said piston and other brake mechanisms, valve mechanism controlling said actuator, tubular connections between said valve mechanism and said actuator cylinder, tubular connections for connecting the valve mechanism to said suction passage and to the atmosphere, and operative connections between said pedal and a movable part of said valve mechanism for effecting the operation of said actuator by movement of the pedal with respect to said pedal lever independently of the movement of said lever, whereby the operator, by placing his foot on the pedal may control, independently or simultaneously, the operation of said independently operable brake mechanisms.

5. In brake mechanisms for automotive vehicles, provided with an internal combustion engine for propelling the same, having a suction passage for explosive mixture between the throttle valve and the engine cylinder, and independently operable brake mechanisms, the combination of a pivoted pedal lever, operative connections between said pedal lever and one set of brake mechanisms, a rocking pedal pivotally connected with said pedal lever, a power actuator comprising a cylinder and piston, operative connections between said piston and other brake mechanisms, valve mechanism controlling said actuator, mounted on said pedal lever, tubular connections between said valve mechanism and said actuator cylinder, tubular connections for connecting the valve mechanism to said suction passage and to the atmosphere, and operative connections between said pedal and a movable part of said valve mechanism for effecting the operation of said actuator by movement of the pedal with respect to said pedal lever independently of the movement of said lever, whereby the operator, by placing his foot on the pedal may control, independently or simultaneously, the operation of said independently operable brake mechanisms.

6. In brake mechanism for an automotive vehicle and trailing vehicle propelled thereby, said vehicles being provided with independently operable brake mechanism, the combination of a pedal lever, operative connections from said pedal lever to the brake mechanisms of one vehicle, a rocking pedal pivotally connected with said pedal lever, and operative connections between said pedal and brake mechanism of the other vehicle, operable by the movement of the pedal with respect to the pedal lever, independently of the movement of the pedal lever, whereby the operator, by placing his foot on said pedal, may independently or simultaneously, control brake mechanisms of both vehicles.

7. In brake mechanism for an automotive vehicle and a trailing vehicle propelled thereby, said vehicles being provided with independently operable brake mechanism, the combination of a pedal lever pivotally supported on one of said vehicles, operative connections from said lever to brake mechanism of one vehicle, a power actuator comprising a cylinder and piston, means for establishing differential pressures on opposite faces of said piston, connections between said piston and a brake mechanism of the other vehicle, a rocking pedal pivotally connected with said lever, valve mechanism controlling said actuator, and operative connections between said pedal and said valve mechanism, whereby the operator, by placing his foot on said pedal, may independently or simultaneously control the brake mechanism of both vehicles.

8. In brake mechanism for an automotive vehicle, and a trailing vehicle controlled thereby, each provided with independently operable brake mechanisms, the combination of a pedal lever mounted on the main vehicle, operative connections between said pedal lever and brake mechanism for the main vehicle, a power actuator carried by said trailing vehicle and comprising a cylinder and piston, means for establishing differential pressures on opposite faces of said piston including controlling valve mechanism, operative connections between said piston and brake mechanism for the trailer, a rocking pedal pivotally connected with said pedal lever, and operative connections between said pedal and said valve mechanism for operating the valve mechanism by the movement of the pedal with respect to said lever, whereby the operator, by placing his foot on the pedal, may, independently or simultaneously control the operation of the brake mechanisms of both vehicles.

9. In brake mechanism for automotive vehicles provided with independently operable sets of brake mechanisms, the combination of a brake lever, a power actuator comprising a cylinder and piston, and controlling valve mechanism, means for establishing differential pressures on opposite faces of said piston under the control of said valve mechanism, operative connections between said valve mechanism and said lever, connections between said actuator piston and one set of brake mechanisms, an auxiliary power actuator comprising a cylinder and piston and controlling valve mechanism, means for establishing differential pressures on opposite faces of the auxiliary actuator under the control of its valve mechanism, connections between the piston of the auxiliary actuator and another set of brake mechanisms, a rocking pedal pivotally connected with said pedal lever, and operative connections between said pedal and the valve mechanism for the auxiliary actuator, whereby the operator, may, by placing his foot on said pedal, control, independently or simultaneously, the operation of said actuators and the brake mechanisms connected therewith.

10. In brake mechanism for automotive vehicles provided with independently operable sets of brake mechanisms, the combination of a brake lever, a power actuator, comprising a cylinder and piston, and controlling valve mechanism, means for establishing differential pressures on opposite faces of said piston under the control of said valve mechanism, operative connections between said valve mechanism and said lever, connections between said actuator piston and one set of brake mechanisms, an auxiliary power actuator comprising a cylinder and piston and controlling valve mechanism, means for establishing differential pressures on opposite faces of the auxiliary actuator under the control of its valve mechanism, connections between the piston of the auxiliary actuator and another set of brake mechanisms, a rocking pedal pivotally connected with said pedal lever, and operative connections between the said pedal and the valve mechanism for the auxiliary actuator, whereby the operator, by placing his foot on said pedal, may control, independently or simultaneously, the operation of said actuators and the brake mechanisms connected therewith, said pedal lever being operatively connected with the piston of the main actuator by means permitting lost motion, to permit the operator to apply his physical force to the brake mechanism operated by the main actuator in addition to the power of the actuator or in case of failure of power.

11. In brake mechanism for automotive vehicles provided with independently operable brake mechanisms, the combination of a pedal lever, a main power actuator comprising a cylinder and piston, and controlling valve mechanism, connections between said piston and one of said independently operable brake mechanisms, connections between said lever and the valve mechanism for the main actuator, an auxiliary power actuator comprising a cylinder and piston and controlling valve mechanism, connections between the piston of the auxiliary actuator and another of said independently operable brake mechanisms, tubular connections from each of said valve connections to sources of higher and lower fluid pressures, a rocking pedal pivotally connected with said lever, and operative connections between said pedal and the valve mechanism for the auxiliary actuator for operating said valve mechanism by a movement of the pedal with respect to said lever independently of the movement of the lever.

12. In brake mechanism for an automotive vehicle and a trailing vehicle propelled thereby, the combination of independently operable brake mechanisms for said vehicles, a separate power actuator for each vehicle, each comprising a cylinder, a piston therein and controlling valve mechanism therefor, connections from the piston of each actuator to brake mechanism of one vehicle, a pivoted pedal lever, operative connections therefor, to the valve mechanism of one of said actuators, a rocking pedal pivotally connected with said lever, operative connections between said pedal and the valve mechanism for the other actuator for operating said valve mechanism by the movement of the pedal with respect to the lever, independent of the movement of the lever, and means for connecting each of said valve mechanisms with sources of higher and lower fluid pressures.

13. In brake mechanisms for an automotive vehicle and a trailing vehicle propelled thereby, the combination of independently operable brake mechanism for said vehicles, a power actuator for each vehicle, each comprising a cylinder, a piston therein, and controlling valve mechanism therefor, operative connections between the piston of each actuator and brake mechanism for one of said vehicles, a pivoted pedal lever on the main vehicle, operative connections therefrom to the valve mechanism of the actuator for said vehicle, a rocking pedal pivotally connected with said pedal lever, operative connections between the said pedal and the valve mechanism for the other of said actuators, and means for connecting each of said valve mechanisms with a source of higher and lower pressure fluids.

14. In brake mechanism for an automotive vehicle and a trailing vehicle propelled thereby, the combination of independently operable brake mechanism for said vehicles, a power actuator for each vehicle, each comprising a cylinder, a piston therein, and controlling valve mechanism therefor, operative connections between the piston of each actuator and brake mechanism for one of said vehicles, a pivoted pedal lever on the main vehicle, operative connections therefrom to the valve mechanism of the actuator for said vehicle, a rocking pedal pivotally connected with said pedal lever, operative connections between the said pedal and the valve mechanism for the other of said actuators, means for connecting each of said valve mechanisms with sources of higher and lower fluid pressures, and operative connections between the pedal lever and the brake mechanism of the main vehicle, to enable said brake mechanism to be applied by the physical force of the operator in case of failure of power.

15. In brake mechanism for an automotive vehicle, and a trailing vehicle propelled thereby, the combination of independently operable brake mechanisms for said vehicles, a power actuator for each vehicle, each comprising a cylinder, a piston therein, and controlling valve mechanism therefor, operative connections between the piston of each actuator and brake mechanism for one of said vehicles, a pivoted pedal lever on the main vehicle, operative connections therefrom to the valve mechanism of the actuator for said vehicle, a rocking pedal pivotally connected with said pedal lever, operative connections between the said pedal and the valve mechanism for the other of said actuators, means for connecting each of said valve mechanisms with sources of higher and lower fluid pressures, and operative connections between the pedal lever and the piston of the actuator for the main vehicle, having provision for lost motion sufficient to permit the operation of the valve mechanism of said actuator to permit the operator to add his physical force to the brake mechanism of the main vehicle, and to operate said brake mechanism by physical force in case of failure of power.

16. In brake mechanism for automotive vehicles, the combination of independently operable brake mechanisms, a main power actuator and an auxiliary power actuator, each comprising a cylinder, and a piston therein, and controlling valve mechanism, connections from each piston to certain of said brake mechanisms means for connecting each of said valve mechanisms with a source of suction and with the atmosphere, said valve mechanisms being constructed to maintain the respective actuator cylinders forward of the pistons therein in communication with the source of suction when the pistons are in retracted position, a pedal lever, connections between the pedal lever and the valve mechanism for the main actuator, a rocking pedal pivotally connected with said pedal lever, and operative connections between said pedal and the valve mechanism for the auxiliary actuator, whereby the operator, by placing his foot on said pedal, may effect a power stroke of either or both actuators without withdrawing material quantities of air from the cylinder, or cylinders, thereof.

17. In brake mechanism for automotive vehicles, the combination of independently operable brake mechanisms, a main power actuator and an auxiliary power actuator, each comprising a cylinder, and a piston therein and controlling valve mechanism, connections from each piston to certain of said brake mechanisms, means for connecting each of said valve mechanisms with a source of suction and with the atmosphere, said valve mechanisms being constructed to connect each of said actuator cylinders on both sides of the pistons thereof with the source of suction when the pistons are in retracted position, a pedal lever, connections between the pedal lever and the valve mechanism for the main actuator, a rocking pedal pivotally connected with said pedal lever, and operative connections between said pedal and the valve mechanism for the auxiliary actuator, whereby the operator, by placing his foot on said pedal, may effect a power stroke of either or both actuators without withdrawing material quantities of air from the cylinder, or cylinders thereof.

18. In brake mechanism for automotive vehicles, the combination with independently operable brake mechanisms, a main power actuator comprising a cylinder and piston, and controlling valve mechanism therefor, operative connections between said piston and certain of said independently operable brake mechanisms, an auxiliary power actuator comprising a cylinder and a double acting piston therein, and controlling valve mechanism therefor, operative connections between said piston and other of said independently operable brake mechanisms, of a pedal lever, connections between said lever and the valve mechanism for the main actuator, the controlling valve mechanism for the auxiliary actuator being carried by said pedal lever, a rocking pedal pivotally connected with said pedal lever, operative connections between said pedal and said valve mechanism for the auxiliary actuator for operating the said valve mechanism by a movement of the pedal with respect to said lever independently of the lever, and means for connecting each of said valve mechanisms with sources of higher and lower fluid pressures.

19. In brake mechanism for automotive vehicles, the combination with independently operable brake mechanisms, a main power actuator comprising a cylinder and piston, and controlling mechanism therefor, operative connections between said piston and one of said independently operable brake mechanisms, an auxiliary power actuator comprising a cylinder and a double acting piston therein, and controlling valve mechanism therefor, of pedal lever connections between said lever and the valve mechanism for the main actuator, the controlling valve mechanism for the auxiliary actuator being carried by said pedal lever, a rocking pedal pivotally connected with said pedal lever, operative connections between said pedal and said valve mechanism for the auxiliary actuator for operating the said valve mechanism by a movement of the pedal with respect to said lever independently of the lever, means for connecting each of said valve mechanisms with sources of higher and lower fluid pressures, the piston of the main actuator being also double acting, and said valve mechanisms being each constructed to connect the respective actuator cylinders on both sides of the pistons therein with said source of lower pressure when the pistons are in retracted position.

20. In brake mechanism for automotive vehicles provided with an internal combustion engine having a suction passage from the carburetor to the engine cylinders, and a throttle valve for said passage, the combination of independently operable brake mechanisms, a pivoted pedal lever operatively connected with certain of said independently operable brake mechanisms, a power actuator comprising a cylinder and piston, connections from said piston to other of said independently operable brake mechanisms, a rocking pedal pivotally connected with said pedal lever, valve mechanism for said actuator, operative connections between said pedal and said valve mechanism for operating the valve mechanism by the movement of the pedal with respect to said lever, and tubular connections for connecting said valve mechanism to said suction passage between the throttle valve and engine cylinders, with the atmosphere, and with the actuator cylinder, whereby the operator, by placing his foot on the pedal, may independently or simultaneously, control the operation of said independently operable brake mechanisms.

21. In brake mechanism for automotive vehicles provided with an internal combustion engine having a suction passage from the carburetor to the engine cylinders, and a throttle valve for said passage, the combination of independently operable brake mechanisms, a pivoted pedal lever operatively connected with certain of said independently operable brake mechanisms, a power actuator comprising a cylinder and piston, connections from said piston to other of said independently operable brake mechanisms, a rocking pedal pivotally connected with said pedal lever, valve mechanism for said actuator, carried by said pedal lever, operative connections between said pedal and said valve mechanism for operating the valve mechanism by the movement of the pedal with respect to said lever, and tubular connections for connecting said valve mechanism to said suction passage between the throttle valve and engine cylinders, with the atmosphere and with the actuator cylinder, whereby the operator, by placing his foot on the pedal, may, independently or simultaneously, control the operation of said independently operable brake mechanisms.

22. In a brake mechanism for automotive vehicles, provided with an internal combustion engine for propelling the same, having a suction passage from the carburetor to the engine cylinders, and a throttle valve for said passage, and a trailing vehicle connected with the main vehicle and propelled thereby, the combination of independently operable brake mechanism for each vehicle, a pedal lever mounted on the main vehicle, operative connections between said pedal lever and brake mechanism for the main vehicle, a power actuator carried by said trailing vehicle and comprising a cylinder and piston therein, operative connections between said piston and brake mechanism for the trailer, a rocking pedal pivotally connected with said pedal lever and movable with respect thereto, controlling valve mechanism for the actuator carried on the main vehicle, operative connections between said pedal and said valve mechanism for operating the valve mechanism by the movement of the pedal with respect to the lever, tubular connections for connecting said valve mechanism with said suction passage between the throttle valve and the engine cylinders, with the atmosphere and with the actuator cylinder, whereby the operator, by placing his foot on the pedal, may, indepedently or simultaneously, control the operation of the brake mechanisms of both vehicles.

23. In brake mechanism for automotive vehicles, provided with an internal combustion engine having a suction passage between the carburetor and the engine cylinders, and a throttle valve for said passage, the combination of independently operable brake mechanisms, a brake lever, a main power actuator comprising a cylinder, a piston and controlling valve mechanism, means for connecting said cylinder with said suction passage between the throttle valve and engine cylinders, and with the atmosphere, under the control of said valve mechanism, operative connections between said valve mechanism and said pedal lever, connections between said actuator piston and certain of said independently operable brake mechanisms, an auxiliary power actuator comprising a cylinder and piston, connections between said auxiliary actuator piston and other of said independently operable brake mechanisms, a rocking pedal pivotally connected with said pedal lever, controlling valve mechanism for the auxiliary actuator, operative connections between said pedal and said auxiliary actuator, valve mechanism for operating it by the relative movement of the pedal with respect to the pedal lever, tubular connections for connecting said auxiliary actuator valve mechanism with said suction passage between the throttle valve and engine cylinders, with the atmosphere and with the auxiliary actuator cylinder, whereby the operator, by placing his foot on said pedal may control independently or simultaneously, the operation of said actuators and the brake mechanisms connected therewith.

24. In brake mechanism for automotive vehicles, provided with an internal combustion engine having a suction passage between the carburetor and the engine cylinders, and a throttle valve for said passage, the combination of independently operable brake mechanisms, a brake lever, a main power actuator comprising a cylinder, a piston and controlling valve mechanism, means for connecting said cylinder with said suction passage between the throttle valve and engine cylinders and with the atmosphere under the control of said valve mechanism, operative connections between said valve mechanism and said pedal lever, connections between said actuator piston and certain of said independently operable brake mechanisms, an auxiliary power actuator comprising a cylinder and piston, connections between said auxiliary actuator piston and other of said independently operable brake mechanisms, a rocking pedal pivotally connected with said pedal lever, controlling valve mechanism for the auxiliary actuator, and connections between said pedal lever and the piston of the main actuator, providing lost motion to permit the operator to apply his physical force to the brake mechanism operated by the main actuator, in addition thereto, or in case of failure of power.

25. In brake mechanism for automotive vehicles, provided with an internal combustion engine having a suction passage between the carburetor and the engine cylinders, and throttle valve for said passage, the combination of independently operable brake mechanisms, a brake lever, a main power actuator comprising a cylinder, a piston and controlling valve mechanism, means for connecting said cylinder with said suction passage between the throttle valve and engine cylinders and with the atmosphere under the control of said valve mechanism, operative connections between said valve mechanism and said pedal lever, connections between said actuator piston and certain of said independently operable brake mechanisms, an auxiliary power actuator comprising a cylinder and piston, connections between said auxiliary actuator piston and other of said independently operable brake mechanisms, a rocking pedal pivotally connected with said pedal lever, controlling valve mechanism for the auxiliary actuator, carried by said pedal lever, operative connections between said pedal and said auxiliary actuator valve mechanism for operating it by the relative movement of the pedal with respect to the pedal lever, tubular connections for connecting said auxiliary actuator valve mechanism with said suction passage between the throttle valve and engine cylinders, with the atmosphere and with the auxiliary actuator cylinder, whereby the operator, by placing his foot on said pedal, may control, independently or simultaneously, the operation of said actuators and the brake mechanisms connected therewith.

26. In brake mechanism for an automotive vehicle, provided with an internal combustion engine, having a suction passage from the carburetor to the engine cyclinders, and a throttle valve for said passage, and a trailing vehicle connected with and propelled by the main vehicle, the combination of independently operable brake mechanisms for said vehicles, a main power actuator mounted on the main vehicle, an auxiliary power actuator mounted on the trailing vehicle, each actuator comprising a cylinder and a piston therein, operative connections between the piston of each actuator and brake mechanism for the vehicle on which it is mounted, controlling valve mechanism for the main actuator, means for connecting the main actuator cylinder with the said suction passage between the throttle valve and engine cylinders, and with the atmosphere under the control of said valve mechanism, a pivoted pedal lever on the main vehicle operatively connected with the valve mechanism for the main actuator, a rocking pedal pivotally mounted on the pedal lever, valve mechanism for the auxiliary actuator mounted on the pedal lever, operative connections between said pedal and the auxiliary actuator, valve mechanism for operating said valve mechanism of the rocking pedal with respect to the pedal lever, tubular connections for connecting said valve mechanism with said suction passage between the throttle valve and engine cylinders, and with the atmosphere, and with the auxiliary actuator cylinder.

27. In brake mechanism for an automotive vehicle provided with an internal combustion engine, having a suction passage from the carburetor to the engine cylinders, and a throttle valve for said passage, and a trailing vehicle connected with and propelled by the main vehicle, the combination of independently operable brake mechanisms for said vehicles, a main power actuator mounted on the main vehicle, an auxiliary power actuator mounted on the trailing vehicle, each actuator comprising a cylinder and a piston therein, operative connections between the piston of each actuator and brake mechanism for the vehicle on which it is mounted, controlling valve mechanism for the main actuator, means for connecting the main actuator cylinder with the said suction passage between the throttle valve and engine cylinders, and with the atmosphere under the control of said valve mechanism, a pivoted pedal lever on the main vehicle operatively connected with the valve mechanism for the main actuator, a rocking pedal pivotally mounted on the pedal lever, valve mechanism for the auxiliary actuator mounted on the pedal lever, operative connections between said pedal and the auxiliary actuator, valve mechanism for operating said valve mechanism of the rocking pedal with respect to the pedal lever, tubular connections for connecting said valve mechanism with said suction passage between the throttle valve and engine cylinders, and with the atmosphere and with the auxiliary actuator cylinder, and operative connections between the pedal lever and the piston on the main actuator, having provision for lost motion sufficient to permit the operation of the valve mechanism of said actuator, to permit the operator to add his physical force to the brake mechanism of the main vehicle, and to operate said brake mechanism by physical force in case of failure of power.

28. In brake mechanism for automotive vehicles provided with an internal combustion engine, having a suction passage between the carburetor and the cylinder, and a throttle valve for said passage, the combination with independently operable brake mechanisms, a main power actuator comprising a cylinder, a piston and controlling valve mechanism therefor, operative connections between said piston and certain of said independently operable brake mechanisms, an auxiliary power actuator comprising a cylinder and a double acting piston therein, and controlling valve mechanism therefor, operative connections between said piston and other of said independently operable brake mechanisms, a pedal lever, connections between said lever and the valve mechanism for the main actuator, the controlling valve mechanism for the auxiliary actuator being carried by said pedal lever, a rocking pedal pivotally connected with said pedal lever, operative connections between said pedal and said valve mechanism for the auxiliary actuator, for operating said valve mechanism by a movement of the pedal with respect to said lever independently of the lever, and means for connecting each of said actuator cylinders with said suction passage between the throttle valve and engine cylinder, and with the atmosphere respectively, under the control of said valve mechanisms.

29. In brake mechanism for automotive vehicles provided with an internal combustion engine, having a suction passage between the carburetor and the cylinder, and a throttle valve for said passage, the combination with independently operable brake mechanisms, a main power actuator comprising a cylinder, a piston and controlling valve mechanism therefor, operative connections between said piston and certain of said independently operable brake mechanisms, an auxiliary power actuator comprising a cylinder and a double acting piston therein, and controlling valve mechanism therefor, operative connections between said piston and other of said independently operable brake mechanisms, a pedal lever, connections between said lever and the valve mechanism for the main actuator, the controlling valve mechanism for the auxiliary actuator being carried by said pedal lever, a rocking pedal pivotally connected with said pedal lever, operative connections between said pedal and said valve mechanism for the auxiliary actuator, for operating said valve mechanism by a movement of the pedal with respect to said lever independently of the lever, means for connecting each of said actuator cylinders with said suction passage between the throttle valve and engine cylinder, and with the atmosphere respectively, under the control of said valve mechanisms, the piston of the main actuator being also double acting, and said valve mechanisms being each constructed to connect the respective actuator cylinders on both sides of the piston therein with said passage, when the pistons are in retracted position.

30. In brake mechanism for automotive vehicles provided with an internal combustion engine, having a suction passage from the carburetor to the engine cylinders, and a throttle valve in said passage, the combination of independently operable brake mechanisms, a main power actuator and an auxiliary power actuator, each comprising a cylinder and a piston therein, and controlling valve mechanism, connections from each piston to certain of said brake mechanisms, means for connecting each of said cylinders with said suction passage and with the atmosphere under the control of its respective valve mechanism, said valve mechanisms being constructed to maintain the respective actuator cylinders forward of the piston therein in communication with said suction passage when the pistons are in retracted position, a pedal lever, connections between the pedal lever and the valve mechanism for the main actuator, a rocking pedal pivotally connected with the pedal lever, operative connections between said pedal and the valve mechanism for the auxiliary actuator, whereby the operator, by placing his foot on said pedal may effect a power stroke of either or both actuators, without delivering material quantities of air from the cylinder or cylinders thereof to said suction passage.

31. In brake mechanism for automotive vehicles provided with an internal combustion engine, having a suction passage from the carburetor to the engine cylinders, and a throttle valve in said passage, the combination of independently operable brake mechanisms, a main power actuator and an auxiliary power actuator, each comprising a cylinder and a piston therein, and controlling valve mechanism, connections from each piston to certain of said brake mechanisms, means for connecting each of said cylinders with said suction passage and with the atmosphere under the control of its respective valve mechanism, said valve mechanisms being constructed to connect each of said actuator cylinders on both sides of the pistons thereof with said suction passage when the pistons are in retracted position, a pedal lever, connections between the pedal lever and the valve mechanism for the main actuator, a rocking pedal pivotally connected with said pedal lever, and operative connections between said pedal and the valve mechanism for the auxiliary actuator, whereby the operator, by placing his foot on said pedal, may effect a power stroke on either or both actuators, without delivering material quantities of air from the cylinder or cylinders thereof to said suction passage.

32. In a brake system for automotive vehicles, the combination with independently operable brake mechanisms, an operator operated part, a power actuator connected with certain of said brake mechanisms, controlling means for said actuator including means mounted on the operator operated part, and connections between said operator operated part and other of said independently operable brake mechanisms for operating the latter independently of those connected with said actuator.

33. In a brake system for automotive vehicles, the combination with independently operable brake mechanisms, a power actuator connected with certain of said brake mechanisms, controlling means for said actuator including an operator operated part, said operator operated part being operatively connected with other of said brake mechanisms by means permitting the operation thereof by physical force of the operator independently of the operation of the other brake mechanisms by said power actuator.

34. In a brake system for automotive vehicles, the combination with independently operable brake mechanisms, a power actuator connected with certain of said brake mechanisms, controlling means for said actuator including an operator operated part, said operator operated part serving to operate other of said independently operable brake mechanisms independently of those connected with the actuator both of said means having a mounting element in common.

35. In a brake system for automotive vehicles, the combination with independently operable brake mechanism, of a single operator operated part and means under the control of the operator operated part for separately actuating said brake mechanisms, to produce any desired braking effect of either of said brake mechanisms independently of the other said operator operated part being connected to operate certain of said mechanisms by physical force.

36. In a brake system for automotive vehicles, the combination with independently operable brake mechanism, of a single operator operated part and means under the control of the operator operated part for simultaneously actuating said brake mechanisms and separately controlling the operation of each to produce any desired braking effect of either brake mechanism independently of the other said operator operated part being connected to operate certain of said mechanisms by physical force.

37. In a brake system for automotive vehicles, the combination with independently operable brake mechanisms, of a single operator operated part a power actuator connected with certain of said brake mechanisms, and means under the control of the operator operated part, for separately effecting the operation by power of the brake mechanisms connected with said actuator, and the operation by physical force of the other brake mechanisms, to produce any desired braking effect of the brake mechanisms operated by either source of power.

38. In brake mechanisms for automotive vehicles having independently operable sets of brake mechanisms, the combination with a pivoted pedal lever, and a rocking pedal pivotally connected therewith for operating said lever, connections between said lever and one set of brake mechanisms for operating the same, operative connections between said pedal and another set of brake mechanisms for effecting the operation thereof by the movement of said pedal with respect to said lever, independently of the movement of the lever.

CALEB S. BRAGG.
VICTOR W. KLIESRATH.